United States Patent [19]

Bialous et al.

[11] 3,859,248

[45] Jan. 7, 1975

[54] THERMAL OXIDATIVELY STABLE POLYCARBONATE COMPOSITION

[75] Inventors: Charles A. Bialous, Evansville; Donald B. G. Jaquiss, New Harmony, both of Ind.

[73] Assignee: General Electric Company, Pittsfield, Mass.

[22] Filed: June 17, 1974

[21] Appl. No.: 479,899

Related U.S. Application Data

[63] Continuation-in-part of Ser. No. 28,988, April 15, 1970, abandoned.

[52] U.S. Cl. ............................................ 260/45.8 A
[51] Int. Cl. ............................................ C08g 51/58
[58] Field of Search ................... 260/47 XA, 45.8 A

[56] References Cited
UNITED STATES PATENTS

| | | | |
|---|---|---|---|
| 3,378,523 | 4/1968 | Caldwell et al. | 260/47 |
| 3,489,716 | 1/1970 | Calkins | 260/45.8 |
| 3,634,312 | 1/1972 | Babillis et al. | 260/45.8 |

OTHER PUBLICATIONS

Mendeleev Chemistry Journal, Vol. 11, No. 3, May-- June 1966, pp. 198 to 205.

Primary Examiner—V. P. Hoke
Attorney, Agent, or Firm—Donald M. Papuga; William F. Mufatti

[57] ABSTRACT

A thermal oxidatively stable polycarbonate composition consisting of the reaction product of bisphenol-A, a carbonate precursor and a minor amount of phosphorus dihalide, the composition having in admixture therewith a particular epoxidized composition in an amount of 0.01 to about 1.0 weight percent wherein the epoxy composition may be an epoxidized cycloaliphatic compound. The formula of the epoxy composition is as follows:

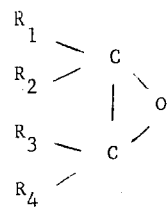

4 Claims, No Drawings

THERMAL OXIDATIVELY STABLE POLYCARBONATE COMPOSITION

This application is a continuation-in-part of U.S. patent application Ser. No. 28,988 filed Apr. 15, 1970, now abandoned.

This invention relates to thermal oxidatively stable polycarbonate compositions and more particularly to polycarbonate compositions having minor amounts of particular phosphorus containing compounds that are actually in the polymer chain and having an epoxy compound in admixture with the particular polycarbonate.

While it is known to incorporate phosphorus into a polymer chain as disclosed by U.S. Pat. No. 3,378,523 and in the publication by G. S. Kolesnikov, et al., Vysokomol.soyed. A–9, No. 10, pages 2,246–2,249, 1967, none of these references discloses the use of minor amounts of phosphorus containing material to be incorporated into the polymer chain to achieve greatly enhanced thermal stability without otherwise changing the nature of the polycarbonate. Due to the use of increased molding temperatures with polycarbonate resins, the exposure of molded shapes to higher temperatures has become more important to preparing polycarbonates having incrased stability to thermal degradation or discoloration when exposed to elevated temperatures. Therefore, it has been surprisingly discovered that by incorporating minor amounts of a particular phosphorus containing material into the polymer chain, thermally stable polycarbonates are obtained.

Therefore it is an object of the instant invention to provide a thermally stable polycarbonate.

Another object of this invention is to provide a thermally stable polycarbonate having minor amounts of phosphorus incorporated into the polymer chain and having an epoxy compound in admixture with a particular polycarbonate.

These and other objects of this invention will become apparent from the following detailed description thereof.

Briefly, according to this invention, the foregoing and other objects are obtained by reacting a dihydric phenol such as 2,2-bis(4-hydroxyphenyl) propane (hereinafter referred to as bisphenol-A), a carbonate precursor and 0.0005 to about 0.01 mole per mole of bisphenol-A of a phosphorus dihalide of the formula:

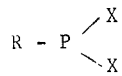

wherein X is a halogen atom independently selected from the group consisting of fluorine, chlorine, bromine and iodine and R is an organic radical of 1–25 carbon atoms and may be either aryl, haloaryl, alkyl, cycloalkyl, aralkyl or alkaryl radicals. The above polymer has in admixture therewith a particular epoxy compound.

The following examples are set forth to illustrate more clearly the principle and practice of this invention to those skilled in the art. Unless otherwise specified, where parts or percents are mentioned, they are parts or percents by weight.

EXAMPLE I

To a reactor fitted with a reflux condenser and mechanical agitator charge 15 gallons of dry methylene chloride, 20 pounds of 2,2-bis (4-hydroxyphenyl)-propane, 18.7 pounds of calcium hydroxide, 188 grams of p-tertiary butylphenol and 4.7 ml. of triethylamine. The slurry is stirred and phosgene is added at a rate of about 13.2 pounds per hour. After 45 minutes, the endpoint is reached and the phosgene addition is terminated. The polycarbonate in solid form is recovered by filtering and evaporation of the solvent. The polycarbonate is dried for 48 hours at 225°F and then extruded at a temperature of about 525°F. The extrudate is comminuted into pellets.

The polycarbonate is designated as I.

EXAMPLE II

To a reactor fitted with a reflux condenser and mechanical agitator, charge 15 gallons of dry methylene chloride, 20 pounds of 2,2-bis (4-hydroxyphenyl)-propane, 18.7 pounds of calcium hydroxide, 188 grams kg. of p-tertiary butylphenol, 4.7 ml. of triethylamine and 5.86 grams of phenylphosphonous dichloride in 25 ml. of methylene chloride. The slurry is stirred and phosgene is added at a rate of about 13.2 pounds per hour. After 45 minutes, the endpoint is reached and the phosgene addition terminated. Polycarbonate in solid form is recovered as in Example I. Elemental phosphorus content of the polycarbonate is determined by the Schoniga combustion test described in *Identification and Analysis of Plastics* by Haslum and Willis, Iliffe Books, London, 1965, page 8, and is found to be 0.0074 weight percent.

The polycarbonate is designated as II.

EXAMPLE III

Each of the polycarbonates I and II above of Examples I and II are molded nto test samples at the temperatures to indicated in Table 1. Thermal stability to discoloration is measured using the IDL Color Eye Colorimeter in terms of APHA numbers (American Public Health Association) on the test specimens as molded and after heat aging at 140°C for 7 days. The results are as follows:

TABLE 1

| Sample | Wt. % Phosphorus | APHA 550°F | APHA 600°F | APHA Heat Aging at 140°F 7 Days 550°F | 600°F |
|---|---|---|---|---|---|
| I | 0 | 39 | 38 | 74 | 82 |
| II | 0.0074 | 22 | 25 | 50 | 59 |

EXAMPLE IV

Example II is repeated except that 0.1 percent of 3,4-epoxy-cyclohexylmethyl 3,4-epoxy cyclohexane carboxylate is blended with polycarbonates I and II and samples are molded at the temperatures so indicated in Table 2. Separate molded samples are also heat aged for 7 days at 140°C. The samples are then measured for thermal stability to discoloration by the same test procedure employed in Example IV. The results are as follows:

TABLE 2

| Sample | Wt. % Phosphorus | APHA 550°F | APHA 600°F | APHA Heat Aged 550°F | APHA Heat Aged 600°F |
|---|---|---|---|---|---|
| I | 0 | 40 | 39 | 75 | 83 |
| II | 0.0074 | 23 | 26 | 34 | 40 |

The instant invention is directed to a thermally stable polymer composition and more particularly to a thermally stable polycarbonate having incorporated into the polymer structure elemental phosphorus in an amount of 0.0005 to about 1.0 weight percent based on the total weight of the polymer. The polymer herein set forth is the residue of the condensation reaction of bisphenol-A, a carbonate percursor and 0.0005 to about 0.01 mole per mole of bisphenol-A of a phosphorus dihalide as represented by the formula:

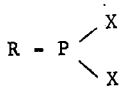

wherein in the above formula, X is a halogen atom independently selected from the group consisting of fluorine, iodine, bromine and chlorine, and R is an organic radical of 1–25 carbon atoms and may be selected from the group consisting of aryl, haloaryl, alkyl, cycloalkyl, aralkyl and alkaryl radicals. Further, the above polymer is admixed with an epoxy composition represented by the following formula:

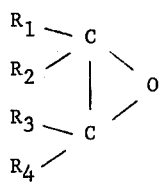

As stated previously, the phosphorus containing compounds are typically represented by the above formula and R therein may be alkyl such as methyl, ethyl, n-propyl, isopropyl, n-butyl, sec-butyl, tertiary-butyl, n-amyl, isoamyl, tertiary amyl, n-hexyl, dodecyl, nonyl, etc., cycloalkyl such as cyclohexyl, 2-methylcyclohexyl, 4-methylcyclohexyl, 2-ethylcyclohexyl, 4-ethylcyclohexyl, 4-isopropylcyclohexyl, etc., aryl such as phenyl, naphthyl, 1-naphthyl, 2-naphthyl, biphenyl, terphenyl, etc.; haloaryl such as 2-chlorophenyl, 2,4,6-trichlorophenyl, 2,4,6-tribromophenyl, etc.; aralkyl such as benzyl, phenylethyl, 2-phenyl-ethyl, 1-phenylpropyl, 2-phenylpropyl, etc.; and alkaryl such as p-tolyl, m-tolyl, o-tolyl, 2,6-xylyl, p-cumyl, m-cumyl, n-cumyl, mesityl, p-tertiary butylphenyl, etc. In place of the phenyl phosphorus dichloride employed in the examples, chloromethylphosphorus dichloride has been used with essentially the same results. In the practice of this invention, the preferred phosphorus dihalide is phenyl phosphorus dichloride.

The epoxy compound employed herein may be represented by the above described formula, namely:

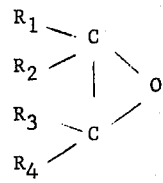

wherein $R_1$, $R_2$, $R_3$ and $R_4$ are independently selected from the group consisting of hydrogen, alkyl, cycloalkyl, aryl, substituted aryl and hetrocyclic organic radicals wherein the organic radicals have a carbon content of 1 to 24 carbon atoms. While the actual number of hydrogen atoms employed may vary, it should be a function of the volatility of the epoxy compound. The number of hydrogen atoms should be such as to minimize the propensity of the epoxy compound to volatize at a low temperature since its benefit in use with the polymer composition of this invention would be lost at the molding temperatures employed in preparing molded articles from the composition of this invention.

The amount of epoxy compound employed in the practice of this invention can vary from 0.01 to 1.0 weight percent based on the weight of the polymer composition and is preferably 0.03 to 0.50 weight percent. While more than 1.0 weight percent of epoxy compound can be employed, it has been found that higher amounts tend to degrade the physical properties of the copolycarbonate phosphite and thereby reduce the usefulness of the polymer in providing tough, flexible molded articles.

In the practice of this invention, other epoxy compounds that have been employed in place of the 2,4-epoxy-cyclohexylmethyl, 3,4-epoxycyclohexane carboxylate in the examples with essentially the same results are 3,4-epoxy-6-methylcyclohexyl-methyl, 3,4-epoxy-6-methylcyclohexane carboxylate, 2,3-epoxy cyclohexylmethyl, 3,4-epoxycyclohexane carboxylate, 4-(3,4-epoxy-5-methyl cyclohexyl) butyl 3,4-epoxycyclohexane carboxylate, 3,4-epoxycyclohexyl ethylene oxide, di-3,4 epoxy-6-methylcyclohexylmethyl adipate, cyclohexyl methyl 3,4-epoxycyclohexane carboxylate, 3,4-epoxy-6-methylcyclohexyl-methyl-6-methylcyclohexyl carboxylate, bisphenol-A diglycidyl ether, tetrabromobisphenol-A diglycidyl ether, diglycidyl ester of phthalic acid, diglycidyl ester of hexahydrophthalic acid, bis-epoxy dicyclopentadienyl ether of ethylene glycol, epoxidized soybean oil, bis-epoxycyclohexyl adipate, butadiene diepoxidide, tetraphenylethylene epoxide, indene oxide, octyl epoxy tallate, cyclododecene epoxide and epoxidized polybutadiene. Preferably the epoxy compound employed in the practice of this invention is 3,4-epoxy cyclyhexylmethyl 3,4-epoxycyclohexane carboxylate.

The dihydric phenols that can be employed herein to prepare the copolymer of this invention are bisphenols such as bis(4-hydroxyphenyl) methane, 2,2-bis(4-hydroxyphenyl) propane, 2,2-bis(4-hydroxy-3-methylphenyl) propane, 4,4-bis(4-hydroxyphenol) heptane, 2,2-bis(4-hydroxy 3,5-dichlorophenyl) propane, 2,2-bis(4-hydroxy 3,5-dibromophenyl) propane, etc., dihydric phenol ethers such as bis(4-hydroxyphenyl) ether, bis(3,5-dichloro-4-hydroxyphenyl) ether, etc., dihydroxydiphenols such as p,p'-dihydroxyphenyl, 3,3'-dichloro-4,4'-dihydroxydiphenyl, etc. dihydroxyaryl sulfones such as bis (4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis-(3,5-dibromo-4-hydroxyphenyl sulfoxide, etc. A variety of additional dihydric phenols are also available to provide carbonate polymers and are disclosed in U.S. Pat. Nos. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

As stated previously, the reaction may be caried out in the presence of an acid acceptor which may be either an organic or an inorganic compound. A suitable organic acceptor is a tertiary amine and includes such mateirals as pyridine, triethylamine, dimethylaniline, tributylamine, etc. The inorganic acid acceptor may be one which can either be an hydroxide, a carbonate, a bicarbonate, or a phosphate of an alkali or alkaline earth metal.

The molecular weight regulators which are also employed in carrying out the process for preparing the aromatic polycarbonate resins can be such molecular weight regulators as phenol, cyclohexanol, methanol, paratertiarybutylphenol, para-bromophenol, etc. Preferably, para-tertiarybutylphenol is employed as the molecular weight regulator.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

We claim:

1. A thermal oxidatively stable polycarbonate composition which is the residue of the condensation reaction of 2,2-bis (4-hydroxyphenyl) propane, a carbonate precursor and 0.0005 to about 0.01 mole per mole of bisphenol-A of a phosphorus dihalide of the formula:

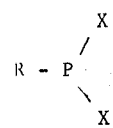

wherein X is a halogen atom independently selected from the group consisting of fluorine, chlorine, bromine and iodine and R is an organic radical selected from the group consisting of aryl, haloaryl, alkyl, cycloalkyl, aralkyl and alkaryl radicals of 1–25 carbon atoms having in admixture therewith 0.01 to about 1.0 weight percent of an epoxy composition having the following formula:

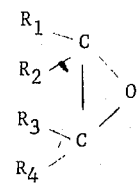

wherein $R_1$, $R_2$, $R_3$ and $R_4$ are organic radicals of 1–24 carbon atoms and are independently selected from the group consisting of hydrogen, alkyl, cycloalkyl, substituted cycloalkyl, aryl and substituted aryl radicals and mixtures thereof.

2. The composition of claim 1 wherein the phosphorus dihalide is phenyl phosphorus dihalide.

3. The composition of claim 1 wherein the epoxy compound is an epoxidized cycloaliphatic compound.

4. The composition of claim 1 wherein the epoxy compound is 3,4-epoxycyclohexylmethyl 3,4-epoxy cyclohexane carboxylate.

* * * * *